United States Patent
Mestha et al.

(10) Patent No.: US 8,103,092 B2
(45) Date of Patent: Jan. 24, 2012

(54) DETERMINING WHETHER A COLOR IS INSIDE OR OUTSIDE A BOUNDARY SURFACE OF A COLOR GAMUT

(75) Inventors: Lalit Keshav Mestha, Fairport, NY (US); Alvaro Enrique Gil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 536 days.

(21) Appl. No.: 12/391,529

(22) Filed: Feb. 24, 2009

(65) Prior Publication Data

US 2010/0215258 A1    Aug. 26, 2010

(51) Int. Cl.
*G06K 9/00* (2006.01)

(52) U.S. Cl. ....................................... 382/162

(58) Field of Classification Search .......... 382/162–167, 382/276–277, 1.9, 518, 525
See application file for complete search history.

(56) References Cited

U.S. PATENT DOCUMENTS

| | | | |
|---|---|---|---|
| 6,157,469 A | 12/2000 | Mestha | |
| 6,724,500 B1 * | 4/2004 | Hains et al. | 358/1.9 |
| 6,744,531 B1 | 6/2004 | Mestha et al. | |
| 7,397,581 B2 | 7/2008 | Mestha et al. | |

OTHER PUBLICATIONS

Cholewo, et al., Gamut Boundary Determination Using Alpha-Shapes, *Proceedings of the 7th Color Imaging Conference*, Scottsdale, Arizona, 1999, 5 pages, Lexmark International, Inc., Lexington, KY, USA.
Braun, et al., "Techniques for Gamut Surface Definition and Visualization," *IS&T/SD fifth Color Imaging Conference: Color Science, Systems and Applications (including CD)*, Scottsdale, Arizona, Nov. 1997; Abstract, 1 page.
Mestha, et al., "Gray Balance Control Loop for Digital Color Printing Systems,"*Imaging Science & Technology NIP21: International Conference on Digital Printing Technologies*, vol. 21, pp. 499-504, Baltimore, MD (Sep. 2005), ISBN/ISSN: 0-89208-257-7.

* cited by examiner

*Primary Examiner* — Duy M Dang
(74) *Attorney, Agent, or Firm* — Philip E. Blair; Fleit Gibbons Gutman Bongini & Bianco P.L.

(57) ABSTRACT

What is disclosed is a novel system and method for quickly and accurately determining whether a color is inside or outside the boundary of a surface of a color gamut. The present method enables a gamut mapping algorithm to quickly identify points which require further processing and those which are already inside the gamut and thus do not need to be processed by the gamut mapping function. The present method can be performed directly on the printing device to determine whether the colors are in/out of the actual gamut surface of the target marking device. Other embodiments have also been disclosed.

21 Claims, 5 Drawing Sheets

DETERMINING WHETHER A COLOR IS INSIDE OR OUTSIDE A BOUNDARY SURFACE OF A COLOR GAMUT

TECHNICAL FIELD

The present invention is directed to systems and methods for determining whether a given color is inside or outside a boundary surface of a color gamut of a target color marking device in a color management system.

BACKGROUND

In digital imaging systems, color management is the controlled conversion between the color representations of various devices, such as image scanners, digital cameras, monitors, TV screens, film printers, computer printers, offset presses, corresponding media, and the like. One primary goal of a color management system is to effectively deal with colors that cannot be reproduced on a target marking device. Gamut mapping algorithms map received color values of an input image to the target gamut of a color output device such that the rendered output colors remain visually consistent with the original image. There is no common method for this process. Performance often depends on the capability of the color mapping methods employed in the color management system.

Before a gamut mapping function maps the color, the method needs to initially make a determination whether a color is inside or outside the color gamut of the target output device. Accurate determination is needed because a color that is wrongly considered as outside the gamut will get mapped to a wrong region in the gamut. This can then lead to unacceptable artifacts, e.g., contours and color errors, being introduced into the image when the image is rendered on the output device. This situation can be avoided if the gamut mapping algorithm has the ability to quickly and accurately determine whether a given spot or node color is inside or outside the gamut of the target output device.

Accordingly, what is needed is a method for quickly and efficiently determining whether a given color is in/out of a gamut of a color marking device.

BRIEF SUMMARY

What is disclosed is a novel system and method for quickly and accurately determining whether a color is inside or outside the boundary of a surface of a color gamut. The present method enables a gamut mapping algorithm to quickly identify points which require further processing and those which are already inside the gamut and thus do not need to be processed by the gamut mapping function.

In one example embodiment, the present method for determining whether a color is inside or outside the boundary of a surface of a color gamut involves the following. A point $x_c$ is identified which has coordinates $\{L^*_c, a^*_c, b^*_c\}$ in $L^*a^*b^*$ space for which a determination is to be made whether the color point is inside or outside the boundary of a surface of a target color gamut. A threshold error value is initialized to a default value. $L^*a^*b^*$ values are obtained using initial input CMYK color separation values for $x_c$ as inputs to the color marking device (or from a model of the device). An amount of deltaE color separation is determined between the $L^*a^*b^*$ values and the $\{L^*_c, a^*_c, b^*_c\}$ values of point $x_c$. The amount of deltaE color separation is then compared to the threshold error value. If the amount of deltaE color separation is less than the threshold error then point $x_c$ is inside the boundary surface of the gamut and no further processing is necessary. Otherwise, the following steps are iteratively performed until a determination is made whether point $x_c$ is inside/outside the boundary surface of the gamut: 1) New CMYK values are generated for point $x_c$ using a feedback controller; 2) New $L^*a^*b^*$ output values are obtained using the new CMYK values as inputs to the color marking device (or a model of the device); 3) An amount of deltaE color separation is determined between the new $L^*a^*b^*$ out values and the $\{L^*_c, a^*_c, b^*_c\}$ values of point $x_c$; 4) The amount of deltaE color separation is compared to the threshold error value. If the deltaE color separation is less than the threshold error then point $x_c$ is inside the boundary surface of the gamut, the loop exits and no further iterations are performed; 6) Otherwise, after a defined number of iterations, a determination is made whether the point is outside the boundary surface of the color gamut. If the point is outside the boundary surface of the color gamut then the coordinates of the point are provided to a gamut mapping function. Various features and embodiments have also been disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a system and method for quickly and accurately determining whether a color is inside or outside the boundary of a surface of a color gamut. The present method enables a gamut mapping algorithm to quickly identify points which require further processing and those which are already inside the gamut and thus do not need to be processed by the gamut mapping function.

It should be understood that one of ordinary skill in this art would be readily familiar with many facets of color science such as, but not limited to, color space, color gamuts, gamut mapping, and other related techniques and algorithms commonly found in the color science arts such as, for instance, color management, device color characterization, digital halftoning, image compression, color quantization, gamut mapping, computationally efficient transform algorithms, and color image processing. Those of ordinary skill would be familiar with the text: "*Digital Color Imaging Handbook*", 1*st* Ed. CRC Press (2003), ISBN-10: 084930900X, ISBN-13:

978-0849309007, which is incorporated herein in its entirety by reference. Additionally, one of ordinary skill would also be familiar with advanced mathematical techniques used for color manipulation and various color transformation processes. One of ordinary skill would be knowledgeable about computer science and software and hardware programming systems and methods sufficient to implement the functionality and capabilities described herein in their own computing environments without undue experimentation.

A Lab color space is a color-opponent space with dimension L* for luminance and a* and b* for the color-opponent dimensions based on non-linearly compressed CIE XYZ color space coordinates. Lab color space is more often used as an informal abbreviation for the CIE 1976 L*a*b* color space also called CIELAB, whose coordinates are {L*, a*, b*}. Chrominance (a) is the chrominance of a first channel. Chrominance (b) is the chrominance of a second channel. Luminance (L) is a photometric quantity which, in essence, is the effect of radiance on our eyes. Radiance is the physical quantity related to light intensity, i.e., the power of the light spreading out in some solid angle over an area. Luminance is the integration of radiance weighted with a curve, which describes how efficiently different wavelengths of light trigger visual receptors in the eye. Brightness is the subjective visual experience of luminance, i.e., the effect of luminance on the brain. Primary colors are understood to be Cyan, Magenta, Yellow, and Black. Secondary colors are understood to be Red, Green, and Blue.

The gamut refers to a complete subset of colors as defined by the spectrum of light, i.e., the distribution of light energy versus wavelength, interacting with the spectral sensitivities of the eye's light receptors and the colorants on the substrate. One of the common usages of the term "gamut" refers to the subset of colors which can be accurately represented in a given circumstance, such as within a given color space or by a certain output device. Digitizing a photograph, converting a digitized image to a different color space, or outputting the image to a given medium using an image output device generally alters its gamut, in the sense that some of the colors in the original image are lost in the color transformation process which translates an input color space to an output color space. In conventional color management systems, a color transformation converts each input color space to an output target color space using mathematical algorithms. The mathematical algorithms of the color profiles for a color transformation process may be convolved to a single mathematical algorithm for efficiency. The gamut of a color marking device, for example, is a multi-dimensional color space having a given volume with the axes of the space being defined by the pigments used in the colorants of the primary colors. Each of the primary colors is transferred to the image-receiving medium. The color gamut is defined by the interaction of the primary colors, and is limited by an amount of toner that can be deposited on the image-receiving medium.

An image processing system refers to a hardware or software system capable of processing an image for output to an image output device. Such a system may include in a color management system placed in the image path of a document reproduction system.

An image output device refers to a device capable of reducing a signal of an image to viewable form. The set of such devices includes printers, xerographic devices, image production and photographic equipment, monitors and other display devices, and the like. Outputting the image means communicating information about the image to an image output device. Such communication may take the form of transmitting the image in the form of signals over a network or other communication pathway, or storing the signals to a memory or storage media for subsequent retrieval. A color marking device, such as an inkjet printer, is one example of an image output device which produces an image from the received signal onto a substrate by the visual integration of colored inks deposited thereon.

Figure 1:
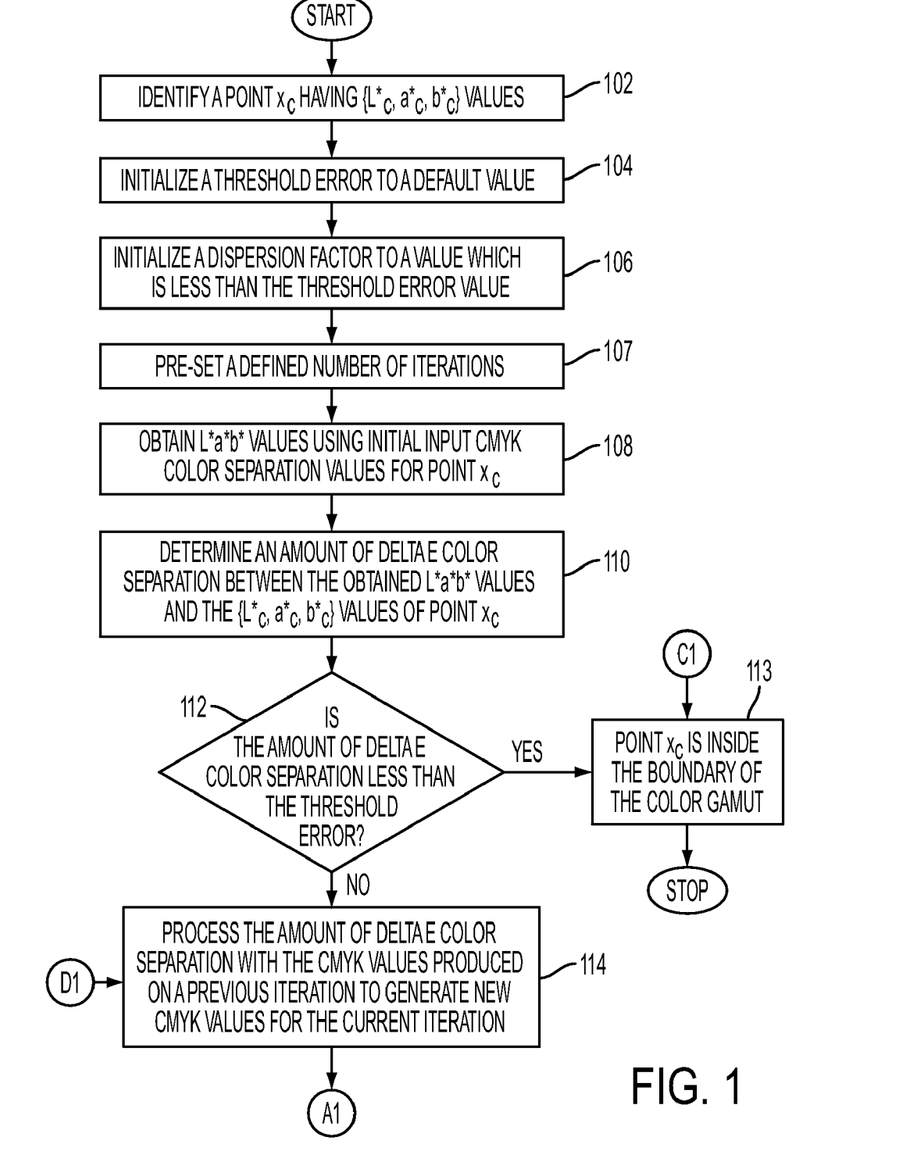
FIG. 1 illustrates one example embodiment of a flow diagram of the present method for determining whether a given color is inside or outside the color gamut of a target marking device.

Reference is now being made to FIG. 1 which illustrates one example embodiment of a flow diagram of the present method for determining whether a color is in or out of the color gamut of a target marking device. For explanatory purposes, the example embodiment discussed is described with respect to a 4-color (CMYK) separation device. It should be understood that the present method is equally applicable to a 3-color (CMY) separation device or a device having N-color separations. Where N=6, the colors may comprise, for example, the colors Cyan, Magenta, Yellow, Black, Orange, and Violet.

At 102, a point $x_c$ in L*a*b* space is identified for which a determination needs to be made whether the point is inside or outside the boundary surface of a color gamut of a color marking device. The point $x_c$ has $\{L^*_c, a^*_c, b^*_c\}$ values. Point $x_c$ may be, for example, a spot color for which a determination needs to be made. If the point is outside the boundary surface of the target gamut then the point is further processed by, for example, providing the point to a gamut mapping function wherein the point is mapped to its nearest in-gamut color using, for instance, a lookup table (LUT).

At 104, a threshold error value is initialized to a default value. The amount of the threshold error needs to be sufficiently low (e.g. 0.05) such that, when it is compared with the amount of deltaE color separation, a determination can be made that the color point is inside or outside the boundary surface of the color gamut of the target color marking device.

At 106, a dispersion threshold is set to a default value. The default value is pre-set to a value which is less than the threshold error value.

At 107, a defined number of iterations to be performed is pre-set to a default value. One example value is 5. This represents the number of times the iterative loop (shown between steps 114 and 120) is repeated before control passes through the determinative step 122 down to step 124. Once the pre-set number of iterations has been performed control always passes thereafter through step 122.

At 108, L*a*b* values are obtained using initial input CMYK color separation values for point $x_c$. In one embodiment, the initial input CMYK color separation values are obtained from a source ICC profile. The source ICC profile may be for a marking device which is different than the target color marking device. The color marking device may comprise of a model which limits each of the initial input N-color separation values to a boundary surface of the color gamut. One method for mapping an out of gamut color to a boundary surface of a color gamut is disclosed in U.S. application Ser. No. 12/391,504, entitled: "Mapping an Out-Of-Gamut Color to a Surface of a Color Gamut", which is incorporated herein in its entirety by reference.

At 110, an amount of deltaE color separation is determined between the L*a*b* values and the $\{L^*_c, a^*_c, b^*_c\}$ values of point $x_c$. Methods for determining a deltaE color separation are well known and should be readily familiar to one of ordinary skill in this art. See, "*Color Technology for Electronic Imaging Devices*", Henry R. Kang, SPIE Optical Engineering Press, (1997), ISBN-10: 0819421081, ISBN-13: 978-0819421081, which is incorporated herein in its entirety by reference.

At 112, a determination is made whether the amount of deltaE color separation is less than the threshold error value.

If the amount of deltaE color separation is less than the threshold error value then, at 113, the identified point $x_c$ is deemed to be inside the boundary surface of the color gamut and no further processing is necessary. Otherwise, the following are performed until a determination is made that point $x_c$ is inside or outside the boundary surface of the gamut of the color marking device.

At 114, the amount of deltaE color separation is processed with the CMYK values produced on a previous iteration to generate new CMYK values for the current iteration using a feedback controller. One example feedback controller is described in: "*Gray Balance Control Loop for Digital Color Printing Systems*", L. K. Mestha, R. Enrique Viturro, Yao Rong Wang, Sohail A. Dianat, Imaging Science & Technology NIP21: International Conference on Digital Printing Technologies, Vol. 21, pp. 499-504, Baltimore, Md., (September 2005), ISBN/ISSN: 0-89208-257-7, which is incorporated herein in its entirety by reference. Since this is an iterative loop, it should be appreciated that default CMYK values are used on a first iteration. In one embodiment, the feedback controller involves calculating a difference between the L*a*b* values and the $\{L^*_c, a^*_c, b^*_c\}$ of point $x_c$ to obtain an amount of an error. This error value is then multiplied by a gain matrix to obtain a gain weighted error vector. One skilled in this art should appreciate that the gain matrix should be stable to avoid oscillations and/or perturbations in the feedback controller. The gain weighted error vector is integrated to obtain an integrated error vector. The integrated error is added to the previous iteration's CMYK values to generate new CMYK values for the current iteration. A sensitivity matrix can be used to obtain the gain matrix. One method for determining a sensitivity matrix is disclosed in U.S. application Ser. No. 12/024,221 entitled: "Sensitivity Matrix Determination for Adaptive Color Control", which is incorporated herein in its entirety by reference.

Figure 2:
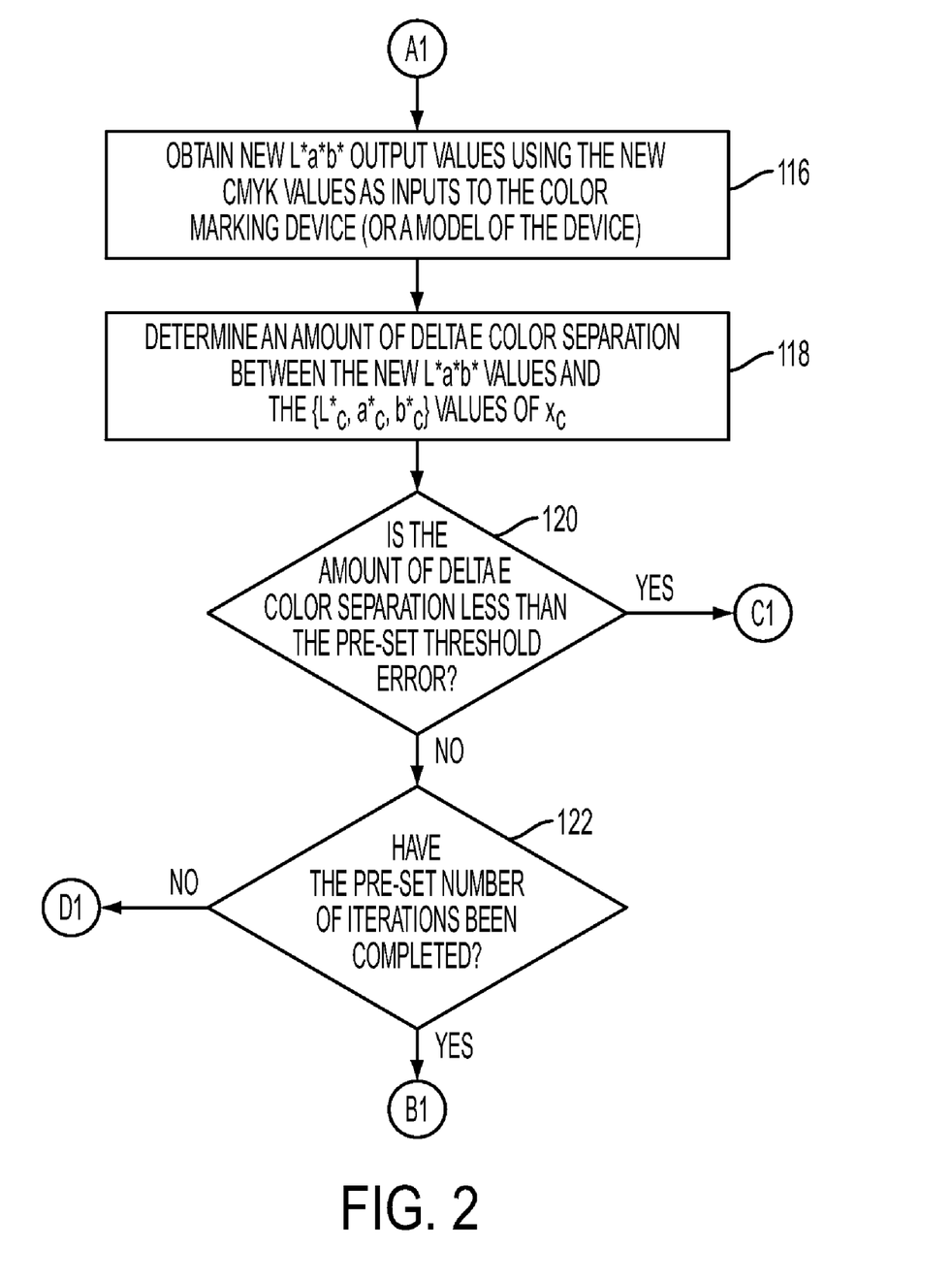
FIG. 2 is a continuation of the flow diagram of FIG. 1 with processing continuing with respect to node A1.

Reference is now made to the flow diagram of FIG. 2 which is a continuation of the flow diagram of FIG. 1 with processing continuing with respect to node A1.

At 116, new L*a*b* output values are obtained using the new CMYK values as inputs to the color marking device. Methods for obtaining L*a*b* values using CMYK values as inputs to a color marking device are well established. In one embodiment, for example, L*a*b* output values are obtained by first printing a test patch using the color marking device and the CMYK values as inputs to the device. Color values are measured for each color printed on the test patch. The measured values are converted to L*a*b* space and the new L*a*b* values obtained therefrom. Alternatively, the L*a*b* output values are obtained using an algorithm which models the color marking device in L*a*b* space given CMYK values as inputs.

At 118, an amount of deltaE color separation is determined between the newly obtained L*a*b* output values and the $\{L^*_c, a^*_c, b^*_c\}$ values of point $x_c$.

At 120, a determination is made whether the amount of deltaE color separation is less than the pre-set threshold error value. If the amount of deltaE color separation is less than the threshold error then processing continues with respect to node C1 of FIG. 1 wherein point $x_c$ is deemed to be inside the boundary surface of the color gamut and no further processing is performed. Otherwise, at 122, a determination is made whether a pre-defined number of iterations have been completed which repeatedly test the amount of deltaE color separation against the threshold error value. An example number of iterations is 10. If the number of iterations has not completed then processing repeats with respect to node D1 of FIG. 1. If the number of iterations have been completed then processing proceeds with respect to node B1 of FIG. 3.

Figure 3:
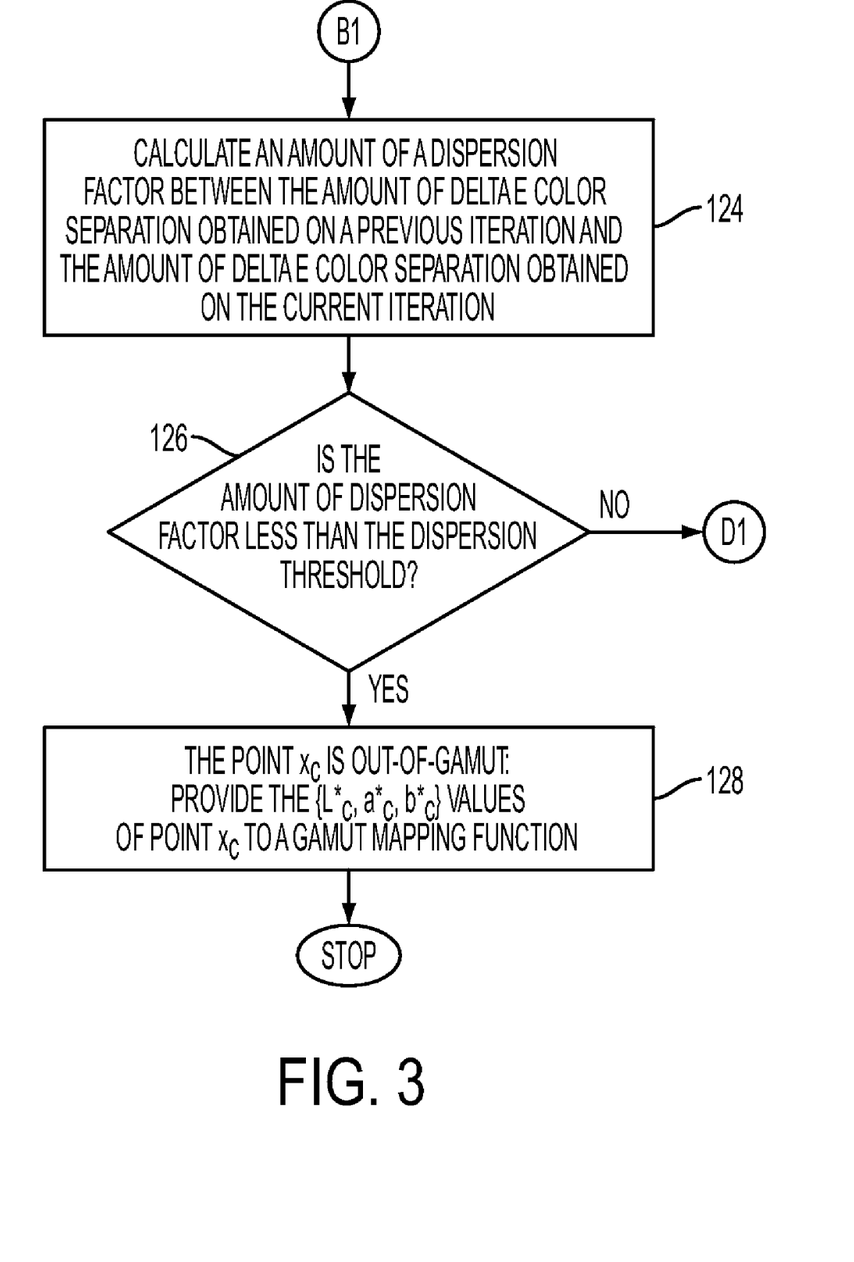
FIG. 3 is a continuation of the flow diagram of FIG. 2 with processing continuing with respect to node B1.

Reference is now made to the flow diagram of FIG. 3 which is a continuation of the flow diagram of FIG. 2 with processing continuing with respect to node B1.

At 124, an amount of a dispersion factor is calculated. In one embodiment, the dispersion amount comprises the absolute value of a difference between the amount of deltaE color separation determined on a previous iteration and the amount of deltaE color separation determined on the current iteration. The difference between the deltaE color separations is referred to herein as the dispersion factor.

At 126, a determination is made whether the calculated amount of dispersion factor is less than the dispersion threshold. If the dispersion factor is less than the dispersion threshold then, at 128, the identified point $x_c$ is deemed to be outside the boundary surface of the color gamut and the $\{L^*_c, a^*_c, b^*_c\}$ values of point $x_c$ are provided to a gamut mapping function. Further processing stops as we now know that the identified point is outside the color gamut. Otherwise, if the amount of dispersion factor is not less than the dispersion threshold, then processing repeats with respect to node D1 of FIG. 1. The iterative loop repeats until a determination has been made, one way or the other, that the identified point is inside or outside the boundary surface of the color gamut of the target color marking device.

The present method not only gives an accurate determination of whether or not the colors are located inside or outside the gamut surface, but it can also be used to perform accurate gamut mapping along the ray axis.

Figure 4:
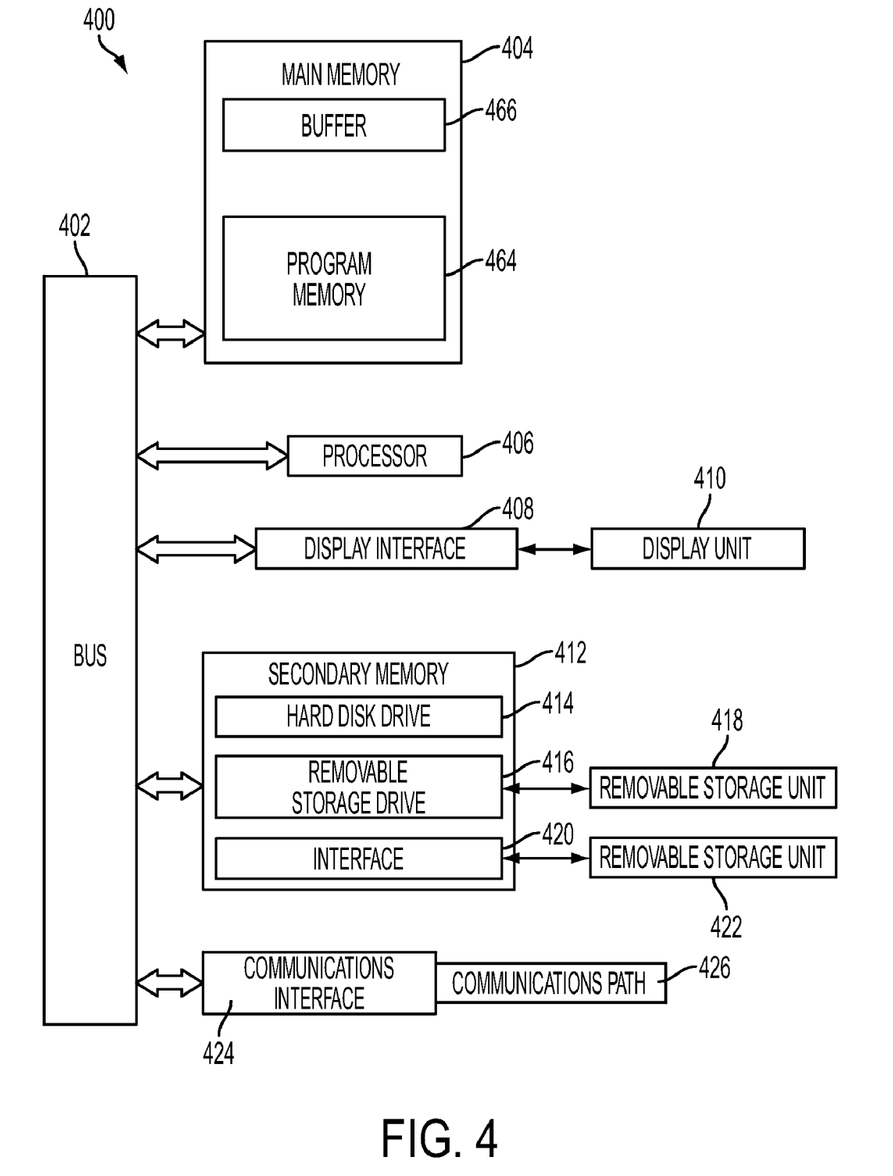
FIG. 4 illustrates a block diagram of one embodiment of a special purpose computer system useful for implementing one or more aspects of the present image resizing method.

Reference is now made to FIG. 4 which illustrates a block diagram of one example embodiment of a special purpose computer useful for implementing one or more aspects of the present determinative method. Such a system could be implemented as a separate computer system, or as electronic circuit, or in an ASIC, for example. The nature of the exact implementation will depend on the image processing environment wherein the present method finds its intended uses.

Special purpose computer system 400 includes processor 406 for executing machine executable program instructions for carrying out all or some of the various aspects of the present method. The processor is in communication with bus 402. The system includes main memory 404 for storing machine readable instructions. Main memory may comprise random access memory (RAM) to support reprogramming and flexible data storage. Buffer 466 stores data addressable by the processor. Program memory 464 stores program instructions. A display interface 408 forwards data from bus 402 to display 410. Secondary memory 412 includes a hard disk 414 and storage device 416 capable of reading/writing to removable storage unit 418, such as a floppy disk, magnetic tape, optical disk, etc. Secondary memory 412 further includes other mechanisms for allowing programs or other machine executable instructions to be loaded into the processor. Such mechanisms may include, for example, a storage unit 422 adapted to exchange data through interface 420 which enables the transfer of software and data to the processor. The system includes a communications interface 424 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 426 which carries such signals and may be implemented using wire, cable, fiber optic, phone line, cellular link, RF, memory, or other means known in the arts.

Figure 5:
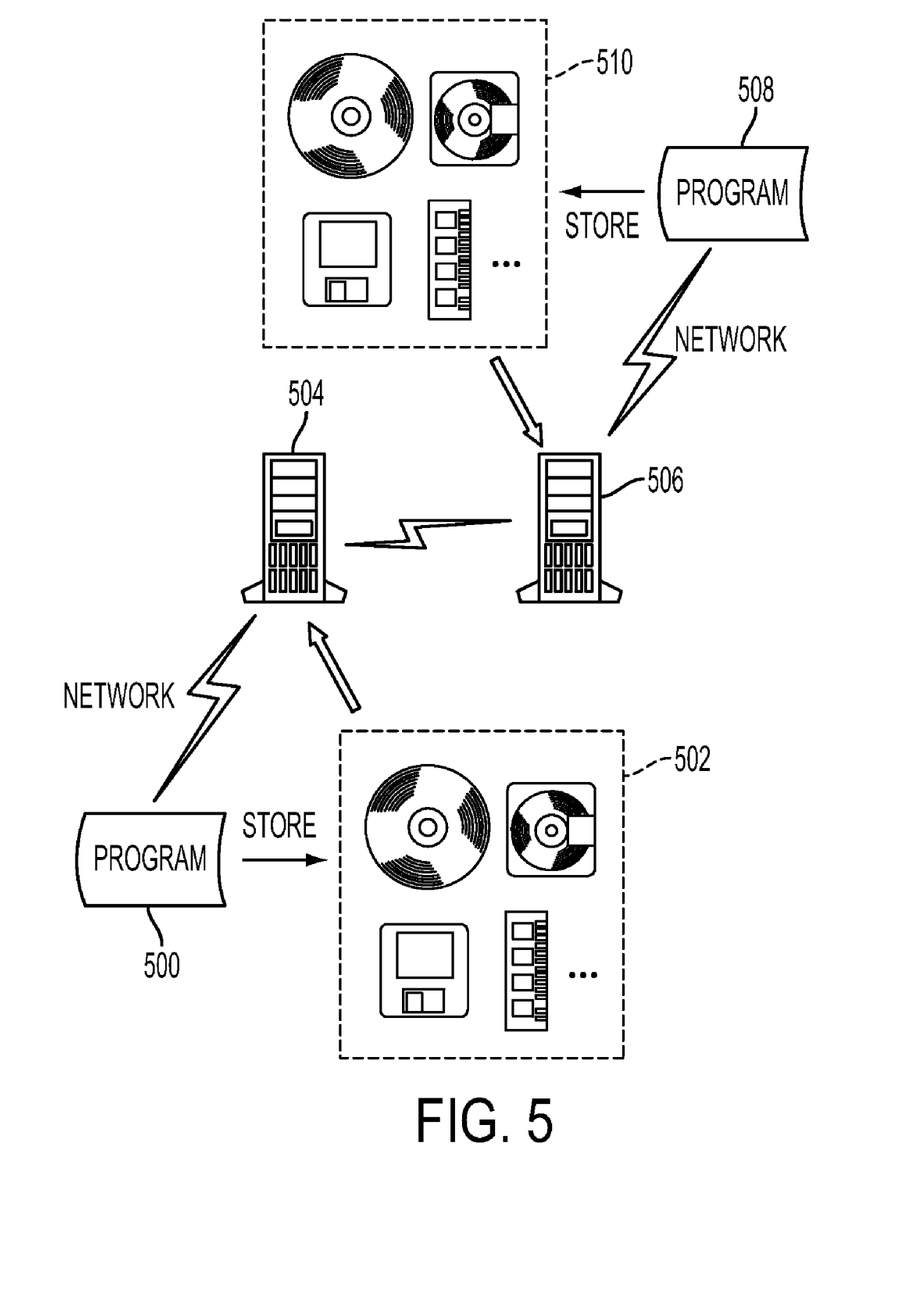
FIG. 5 is an explanatory diagram illustrating one example computer readable medium capable of storing machine readable instructions which, when mounted on a computer or a special purpose computer system, causes the system to perform one or more aspects of the present method.

Reference is now made to FIG. 5 which is an explanatory diagram illustrating one example of a computer readable storage medium capable of storing machine readable instructions which, when mounted on a computer or a special purpose computer system, causes the system to perform one or more aspects of the present method described above. The machine readable instructions may be modified by one computer and transferred to another computer.

In the illustrated embodiment, one or more computer programs 500 for carrying out the present method are loaded on a computer-readable storage media 502 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states or orientations in response to program instructions having been transferred to the media. The computer programs containing machine executable instructions of the present method can then be mounted on computer 504 and transferred or otherwise communicated to computer 506. The program instructions can then be off-loaded to another medium 508, in original form or modified, including data, and stored on storage media 510. Both of the computer systems include processors capable of executing machine readable program instructions. The processor may be placed in communication with an image scanning device (not shown) for receiving the pixel values directly therefrom.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein. Computer readable medium may additionally comprise information in a transitory state medium such as a network link or a network interface which may include a wired network or a wireless network which allows a computer to read such computer readable information.

It should be understood that the flow diagrams hereof are intended to be illustrative. Other operations may be added, modified, enhanced, or consolidated. Variations thereof are intended to fall within the scope of the appended claims.

It should be understood that one or more aspects of the present method are intended to be incorporated in an article of manufacture, including one or more computer program products. The article of manufacture may be included on at least one storage device readable by a machine architecture, xerographic, color management, or other image processing system capable of executing program instructions. The article of manufacture may be included as part of a xerographic system, color management system, an operating system, a software program, a plug-in, and the like, as are known in the arts. Such an article of manufacture may further be shipped, sold, leased, or otherwise provided either alone or as part of an add-on, update, upgrade, or product suite by the assignee or a licensee hereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for determining whether a given color is inside or outside a boundary surface of a color gamut of a color marking device, the method comprising:

identifying a given point $x_c$ in L*a*b* space having $\{L_c^*, a_c^*, b_c^*\}$ values;

setting a threshold error value to a default value, said threshold error value being used for determining whether point $x_c$ is inside or outside a boundary surface of a color gamut of a color marking device;

obtaining L*a*b* values using initial input N-color separation values for point $x_c$, where $N \geq 3$;

determining an amount of deltaE color separation between said L*a*b* values and said $\{L_c^*, a_c^*, b_c^*\}$ values of point $x_c$;

in response to said deltaE color separation being less than said threshold value, determining that point $x_c$ is inside said boundary surface of said color gamut;

otherwise, repeating until a determination has been made whether point $x_c$ is inside or outside said boundary surface of said color gamut:

generating new N-color values for point $x_c$ using a feedback controller;

obtaining new L*a*b* output values using said new N-color values as inputs;

determining an amount of deltaE color separation between said new L*a*b* output values and said $\{L_c^*, a_c^*, b_c^*\}$ values of point $x_c$;

comparing said deltaE color separation with said threshold error value, and in response to said deltaE color separation being less than said threshold error value, determining that $x_c$ is inside said boundary surface of said gamut; and otherwise, after a defined number of iterations, making a determination whether point $x_c$ is outside said boundary surface of said gamut; and in response to a determination that $x_c$ is outside said boundary surface of said color gamut, providing said $\{L_c^*, a_c^*, b_c^*\}$ values to a gamut mapping function.

2. The method of claim 1, wherein said new L*a*b* output values are obtained from said color marking device using said new N-color values as inputs, comprising:

printing a patch of said N-color values using said color marking device;

measuring at least one color value for each color printed on said patch; and converting said measured color values to L*a*b* space to obtain said new L*a*b* output values.

3. The method of claim 1, further comprising:

setting a dispersion threshold to a value which is less than said threshold error value; and wherein making said determination whether point $x_c$ is outside said boundary surface of said gamut comprises:

determining an absolute value of a difference between said amount of deltaE color separation determined on a previous iteration and said deltaE color separation determined on the current iteration to produce a dispersion factor; and comparing said dispersion factor with said dispersion threshold, and in response to said dispersion factor being less than said dispersion threshold, determining that point $x_c$ is outside said boundary surface of said gamut.

4. The method of claim 1, wherein said new L*a*b* output values are obtained from an algorithm which models said color marking device in L*a*b* space using said new N-color values as inputs.

5. The method of claim 1, wherein said feedback controller comprises:

calculating a difference between said L*a*b* output values and said $\{L_c^*, a_c^*, b_c^*\}$ values of point $x_c$ to produce an error value;

multiplying said error value by a gain matrix to obtain a gain weighted error vector;

integrating said gain weighted error vector to obtain an integrated vector; and adding said integrated vector to said N-color values to obtain said new N-color values.

6. The method of claim 1, wherein said initial input N-color separation values are obtained from a source ICC profile for point $x_c$.

7. The method of claim 1, wherein said color marking device comprises a model which limits each of said initial input N-color separation values to a boundary surface of said color gamut.

8. A system for determining whether a given color is inside or outside a boundary surface of a color gamut of a color marking device, the system comprising:

a memory and a storage medium; and a processor in communication with said storage medium and said memory, said processor executing machine readable instructions for performing:

identifying a given point $x_c$ in L*a*b* space having $\{L_c^*, a_c^*, b_c^*\}$ values;

setting a threshold error value to a default value, said threshold error value being used for determining whether point $x_c$ is inside or outside a boundary surface of a color gamut of a color marking device;

obtaining L*a*b* values using initial input N-color separation values for point $x_c$, where $N \geq 3$;

determining an amount of deltaE color separation between said L*a*b* values and said $\{L_c^*, a_c^*, b_c^*\}$ values of point $x_c$;

in response to said deltaE color separation being less than said threshold value, determining that point $x_c$ is inside said boundary surface of said color gamut;

otherwise, repeating until a determination has been made whether point $x_c$ is inside or outside said boundary surface of said color gamut:

generating new N-color values for point $x_c$ using a feedback controller;

obtaining new L*a*b* output values using said new N-color values as inputs;

determining an amount of deltaE color separation between said new L*a*b* output values and said $\{L_c^*, a_c^*, b_c^*\}$ values of point $x_c$;

comparing said deltaE color separation with said threshold error value, and in response to said deltaE color separation being less than said threshold error value, determining that $x_c$ is inside said boundary surface of said gamut; and otherwise, after a defined number of iterations, making a determination whether point $x_c$ is outside said boundary surface of said gamut; and in response to a determination that $x_c$ is outside said boundary surface of said color gamut, providing said $\{L_c^*, a_c^*, b_c^*\}$ values to a gamut mapping function.

9. The system of claim 8, wherein said new L*a*b* output values are obtained from said color marking device using said new N-color values as inputs, comprising:

printing a patch of said N-color values using said color marking device;

measuring at least one color value for each color printed on said patch; and converting said measured color values to L*a*b* space to obtain said new L*a*b* output values.

10. The system of claim 8, further comprising:

setting a dispersion threshold to a value which is less than said threshold error value; and wherein making said determination whether point $x_c$ is outside said boundary surface of said gamut comprises:

determining an absolute value of a difference between said amount of deltaE color separation determined on a previous iteration and said deltaE color separation determined on the current iteration to produce a dispersion factor; and comparing said dispersion factor with said dispersion threshold, and in response to said dispersion factor being less than said dispersion threshold, determining that point $x_c$ is outside said boundary surface of said gamut.

11. The system of claim 8, wherein said new L*a*b* output values are obtained from an algorithm which models said color marking device in L*a*b* space using said new N-color values as inputs.

12. The system of claim 8, wherein said feedback controller comprises:

calculating a difference between said L*a*b* output values and said $\{L_c^*, a_c^*, b_c^*\}$ values of point $x_c$ to produce an error value;

multiplying said error value by a gain matrix to obtain a gain weighted error vector;

integrating said gain weighted error vector to obtain an integrated vector; and adding said integrated vector to said N-color values to obtain said new N-color values.

13. The system of claim 8, wherein said initial input N-color separation values are obtained from a source ICC profile for point $x_c$.

14. The system of claim 8, wherein said color marking device comprises a model which limits each of said initial input N-color separation values to a boundary surface of said color gamut.

15. A computer program product for determining whether a given color is inside or outside a boundary surface of a color gamut of a color marking device, the computer program product comprising:

a non-transitory computer readable media for storing instructions that, when executed on a computer, cause the computer to perform a method comprising:

identifying a given point $x_c$ in L*a*b* space having $\{L_c^*, a_c^*, b_c^*\}$ values;

setting a threshold error value to a default value, said threshold error value being used for determining whether point $x_c$ is inside or outside a boundary surface of a color gamut of a color marking device;

obtaining L*a*b* values using initial input N-color separation values for point $x_c$, where $N \geq 3$;

determining an amount of deltaE color separation between said L*a*b* values and said {$L_c^*$, $a_c^*$, $b_c^*$} values of point $x_c$;

in response to said deltaE color separation being less than said threshold value, determining that point $x_c$ is inside said boundary surface of said color gamut;

otherwise, repeating until a determination has been made whether point $x_c$ is inside or outside said boundary surface of said color gamut:

generating new N-color values for point $x_c$ using a feedback controller;

obtaining new L*a*b* output values using said new N-color values as inputs;

determining an amount of deltaE color separation between said new L*a*b* output values and said {$L_c^*$, $a_c^*$, $b_c^*$} values of point $x_c$;

comparing said deltaE color separation with said threshold error value, and in response to said deltaE color separation being less than said threshold error value, determining that $x_c$ is inside said boundary surface of said gamut; and     otherwise, after a defined number of iterations, making a determination whether point $x_c$ is outside said boundary surface of said gamut; and in response to a determination that $x_c$ is outside said boundary surface of said color gamut, providing said {$L_c^*$ $a_c^*$, $b_c^*$} values to a gamut mapping function.

16. The computer program product of claim 15, wherein said new L*a*b* output values are obtained from said color marking device using said new N-color values as inputs, comprising:

printing a patch of said N-color values using said color marking device;

measuring at least one color value for each color printed on said patch; and converting said measured color values to L*a*b* space to obtain said new L*a*b* output values.

17. The computer program product of claim 15, further comprising:

setting a dispersion threshold to a value which is less than said threshold error value; and wherein making said determination whether point $x_c$ is outside said boundary surface of said gamut comprises:

determining an absolute value of a difference between said amount of deltaE color separation determined on a previous iteration and said deltaE color separation determined on the current iteration to produce a dispersion factor; and comparing said dispersion factor with said dispersion threshold, and in response to said dispersion factor being less than said dispersion threshold, determining that point $x_c$ is outside said boundary surface of said gamut.

18. The computer program product of claim 15, wherein said new L*a*b* output values are obtained from an algorithm which models said color marking device in L*a*b* space using said new N-color values as inputs.

19. The computer program product of claim 15, wherein said feedback controller comprises:

calculating a difference between said L*a*b* output values and said {$L_c$, $a_c^*$, $b_c^*$} values of point $x_c$ to produce an error value;

multiplying said error value by a gain matrix to obtain a gain weighted error vector;

integrating said gain weighted error vector to obtain an integrated vector; and adding said integrated vector to said N-color values to obtain said new N-color values.

20. The computer program product of claim 15, wherein said initial input N-color separation values are obtained from a source ICC profile for point $x_c$.

21. The computer program product of claim 15, wherein said color marking device comprises a model which limits each of said initial input N-color separation values to a boundary surface of said color gamut.

* * * * *